(12) United States Patent
Tawarada et al.

(10) Patent No.: US 7,469,611 B2
(45) Date of Patent: Dec. 30, 2008

(54) VEHICULAR POWER UNIT WITH IMPROVED TRANSMISSION STRUCTURE

(75) Inventors: Yuichi Tawarada, Saitama (JP); Hiroyuki Kawakubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 11/387,663

(22) Filed: Mar. 23, 2006

(65) Prior Publication Data
US 2006/0213478 A1    Sep. 28, 2006

(30) Foreign Application Priority Data
Mar. 28, 2005   (JP)   ............... 2005-092401

(51) Int. Cl.
*F16H 59/00* (2006.01)
*F16H 63/00* (2006.01)
*F16J 61/00* (2006.01)

(52) U.S. Cl. ................... 74/335; 74/329; 74/337.5

(58) Field of Classification Search ............ 74/325, 74/329, 335, 337.5, 357, 362, 606 R; 123/195 C, 123/197.1; 180/219, 230; 280/275, 277
See application file for complete search history.

(56) References Cited

U.S. PATENT DOCUMENTS

| 4,920,825 | A | | 5/1990 | Okazaki et al. | |
|---|---|---|---|---|---|
| 5,333,578 | A | * | 8/1994 | Shimura et al. | .......... 123/90.17 |
| 6,497,211 | B2 | * | 12/2002 | Nomura et al. | .......... 123/195 R |
| 6,832,590 | B2 | * | 12/2004 | Hattori et al. | .......... 123/195 R |
| 2005/0056107 | A1 | * | 3/2005 | Tomita et al. | ................ 74/325 |
| 2005/0085329 | A1 | | 4/2005 | Kawakubo et al. | |
| 2005/0087032 | A1 | | 4/2005 | Kawakubo et al. | |

FOREIGN PATENT DOCUMENTS

| CA | 2476811 | 3/2005 |
|---|---|---|
| GB | 2404705 | 2/2005 |
| JP | 10-077858 | 3/1998 |
| JP | 2003-148612 | 5/2003 |

* cited by examiner

*Primary Examiner*—David D. Le
(74) *Attorney, Agent, or Firm*—Carrier, Blackman & Associates, P.C.; William D. Blackman; Joseph P. Carrier (57) ABSTRACT

A transmission structure of a power unit for a vehicle includes a clutch mechanism that is provided between a crankshaft and a main shaft, and is installed at the end of the main shaft outside a crankcase. The transmission includes a shift drum for driving shift forks for selectively establishing any of plural speeds. Both ends in an axial direction of the shift drum are rotatably supported by the crankcase. In the transmission structure, a sealed structure dedicated to the shift drum is not required, the number of parts is reduced and the assembly time is reduced. The shift drum, arranged in the maximum outside diameter of the clutch mechanism when viewed in a plane perpendicular to the axis of the main shaft, is assembled in the crankcase from the side of the clutch mechanism.

17 Claims, 8 Drawing Sheets

VEHICULAR POWER UNIT WITH IMPROVED TRANSMISSION STRUCTURE

CROSS-REFERENCE TO RELATED APPLICATIONS

The present invention claims priority under 35 USC 119 based on Japanese patent application No. 2005-092401, filed on Mar. 28, 2005. The subject matter of this priority document is incorporated by reference herein.

BACKGROUND OF THE INVENTION

1. Field of the Invention

The present invention relates to transmission structure of a power unit for a vehicle where a crankshaft, a main shaft and a countershaft provided with plural gear sets, which can be selectively established between the countershaft and the main shaft, where these shafts are all rotatably supported by a crankcase such that axes thereof are mutually parallel. A clutch mechanism is provided between the crankshaft and the main shaft, and is installed at an end of the main shaft outside the crankcase. A shift drum for driving shift forks for selectively establishing a selected gear is provided, and both ends of the shift drum are supported by the crankcase so that the shift drum can be rotated about an axis parallel to the crankshaft, the main shaft and the countershaft.

2. Description of the Background Art

It is known to provide a power unit for a vehicle in which a clutch mechanism is installed at one end of a main shaft of a transmission. In the known power unit, the transmission is provided with multiple gear sets and a shift drum for driving shift forks, and is assembled in a crankcase from a side opposed to the clutch mechanism. Such a power unit is disclosed, for example, in JP-A No. 77858/1998.

However, since in the power unit disclosed in JP-A No. 77858/1998, in a power unit in which a shift drum is assembled in a crankcase from the side opposed to a clutch mechanism, a sealed structure dedicated to the shift drum is required. As a result, the number of parts is increased, and the time required for assembly is increased.

The invention is made in view of such a situation, and the object is to provide the transmission structure of a power unit for a vehicle in which no sealed structure dedicated to a shift drum is required, whereby the number of parts can be reduced and the manhours of assembly can be reduced.

SUMMARY

To achieve the object, a first aspect of the invention is based upon the transmission structure of a power unit for a vehicle where a crankshaft, a main shaft and a countershaft provided with plural gear sets which can be selectively established between the countershaft and the main shaft are rotatably supported by a crankcase such that the axes of the shafts are mutually parallel. A clutch mechanism is provided between the crankshaft and the main shaft, and is installed at the end of the main shaft outside the crankcase. A shift drum for driving shift forks for selectively establishing the gear train is provided, and both ends in an axial direction of the shift drum are supported by the crankcase so that the shift drum can be rotated about an axis parallel to the crankshaft, the main shaft and the countershaft. The invention is characterized in that the shift drum is arranged in the maximum outside diameter of the clutch mechanism when viewed in a plane perpendicular to the axis of the main shaft, and is assembled in the crankcase from the side of the clutch mechanism.

In addition, a second aspect of the invention is based upon the configuration of the invention according to the first aspect thereof, and is further characterized in that a transmission chamber housing each gear train and the shift forks is formed in the crankcase at the back of the crankshaft, where the term back is used for a state when the power unit is mounted in the vehicle. A shift drum chamber, forming a part of the transmission chamber and housing most of the shift drum, is formed in the rear of the crankcase so that the shift drum chamber protrudes semi-circularly toward the rear of the crankcase when the shift drum chamber is viewed from an axial direction of the shift drum.

A third aspect of the invention is based upon the configuration of the invention according to the second aspect thereof, and is characterized in that the crankcase is formed by connecting respective cast upper and lower cases. In addition, the crankshaft and the countershaft are rotatably supported between bonded faces of the upper and lower cases, and an upper part of the transmission chamber formed by the upper case overlaps with the clutch mechanism when viewed in a plane perpendicular to the axis of the main shaft.

Further, a fourth aspect of the invention is based upon the configuration of the invention according to the second or third aspects thereof, and is characterized in that a receiving flange is formed in a member that forms at least a part of the crankcase, and cast for supporting both ends of the shift drum. The receiving flange receives a bearing member, the bearing member being installed from the side of the clutch mechanism on the periphery of one end of the shift drum on the side of the clutch mechanism. The shift drum chamber is cast such that the shift drum chamber has the same diameter as the inside diameter of the receiving flange.

According to the first aspect of the invention, since the shift drum is arranged in the maximum outside diameter of the clutch mechanism when viewed in a plane perpendicular to the axis of the main shaft, and the shift drum is assembled in the crankcase from the side of the clutch mechanism, a part to be sealed between the shift drum and the crankcase is included in a sealed range of the clutch mechanism, the sealed range is not required to be enlarged, and as sealed structure dedicated to the shift drum is not required, the number of parts and the man-hours of assembly can be reduced.

According to the second aspect of the invention, the shift drum chamber forms a part of the transmission chamber, houses most of the shift drum, and is formed in the rear of the crankcase so that the shift drum chamber protrudes semi-circularly toward the rear of the crankcase. As a result, a part except the shift drum chamber in the transmission chamber can be made compact.

According to the third aspect of the invention, the upper part of the transmission chamber is formed by the upper case, and overlaps with the clutch mechanism when viewed in a plane perpendicular to the axis of the main shaft. As a result, the rear end of the crankcase can be arranged in close proximity to the axis of the countershaft when the power unit is mounted in the vehicle. When the transmission structure is applied to a motorcycle provided with a swing arm for supporting a rear wheel, the part for supporting the front end of the swing arm can be arranged close to the countershaft.

Further, according to the fourth aspect of the invention, since the shift drum chamber is formed by casting, machining is not required and the cost can be reduced. In addition, since a small assembly, in which a shift drum subassembly such as a bearing for holding the shift drum is attached to the shift drum beforehand, can be assembled in the crankcase, assembly performance is enhanced.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
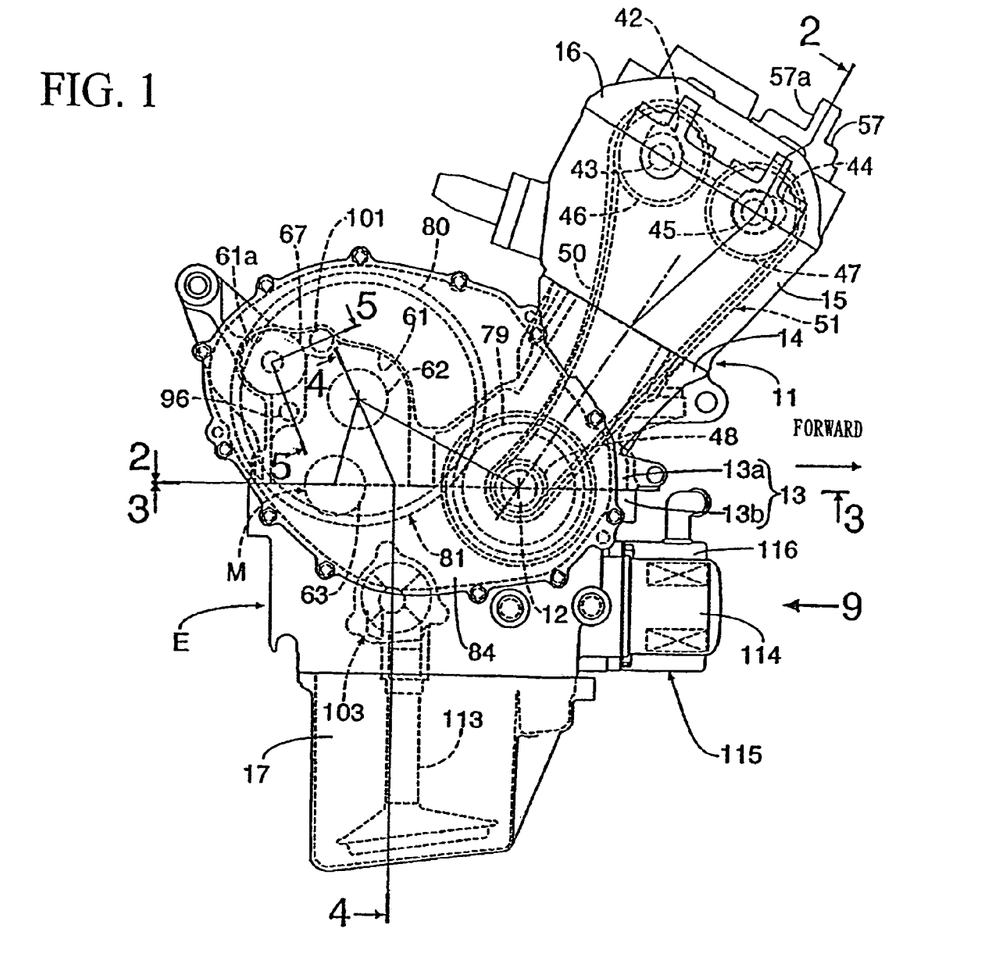
FIG. 1 is a side view of a power unit showing a crankshaft and a transmission countershaft rotatably supported between upper and lower halves of the crankcase.

Referring first to FIG. 1, the power unit is mounted in a vehicle, for example, a motor cycle, and is provided with, for example, a transversely mounted in-line 4-cylinder water-cooled engine E and a constant-mesh type transmission M that changes the effective speed of the engine output, and operatively transmits the output of the engine E to a vehicle wheel (not shown).

The engine E includes an engine body 11, which is provided with a crankcase 13 for supporting a crankshaft 12. The crankshaft 12 has an axis that extends in a lateral direction of the motorcycle so that the crankshaft can be rotated. The engine body 11 includes a cylinder block 14 coupled to the crankcase 13 on the front side in a traveling direction of the motorcycle, and a cylinder head 15 coupled to the upper end of the cylinder block 14. The engine body 11 also includes a head cover 16 coupled to the upper end of the cylinder head 15, and an oil pan 17 coupled to a lower part of the crankcase 13.

The crankcase 13 is formed by mutually connecting an upper case 13a and a lower case 13b. Both the upper case 13a and the lower case 13b are formed by casting. The crankshaft 12 is rotatably supported between the upper case 13a and the lower case 13b.

Figure 2:
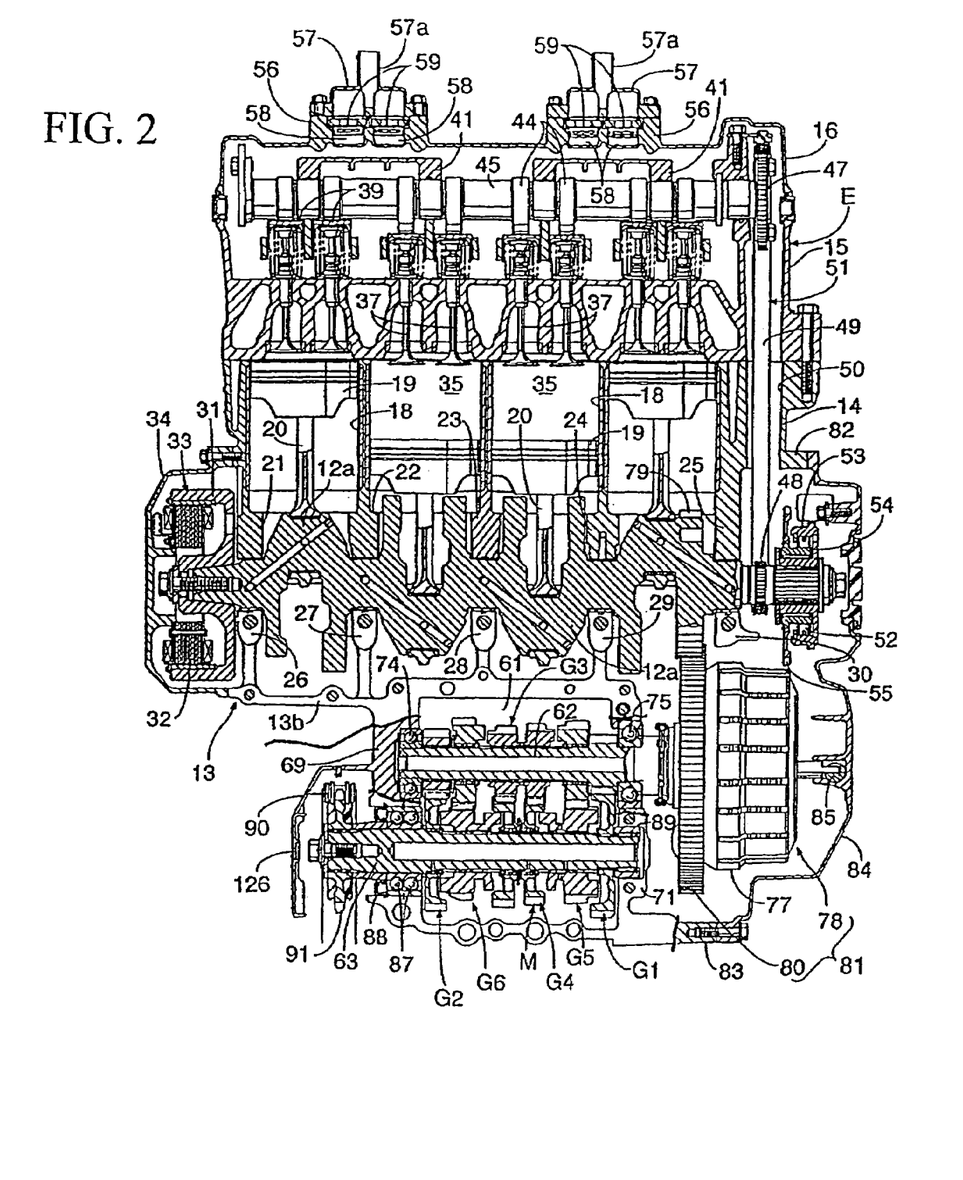
FIG. 2 is a sectional view of the power unit of FIG. 1 viewed along a line 2-2, showing a one-way clutch disposed at left end of the crankshaft, and a second clutch disposed at a left end of the transmission main shaft.

Also referring to FIG. 2, the cylinder block 14 is integrated with the upper case 13a of the crankcase 13 in a state that the cylinder block is inclined forwardly in the traveling direction of the motorcycle. The cylinder block 14 includes four cylinder bores 18 arranged along the axis of the crankshaft 12, and a piston 19 is fitted into each cylinder bore 18 so that the piston can reciprocate therein. Each piston 19 is coupled to a crankpin 12a, with which the crankshaft 12 is provided, via a connecting rod 20.

Figure 3:
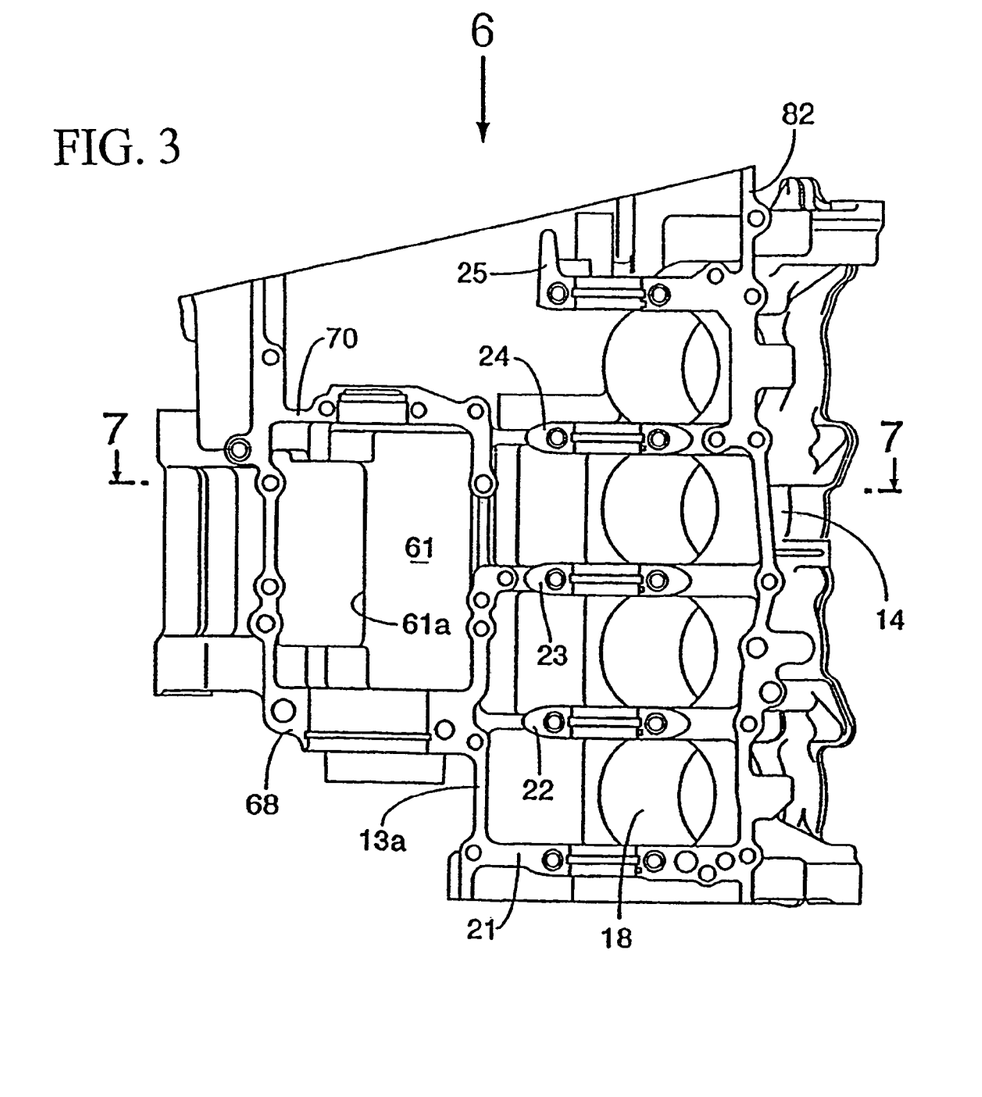
FIG. 3 is a bottom view of the power unit of FIG. 1 along a line 3-3 showing the upper case.

Also referring to FIG. 3, five first to fifth upper journal walls 21 to 25, arranged at spaced intervals from the left side to the right side along the axis of the crankshaft 12, are provided in the upper case 13a of the crankcase 13. Here, and throughout the description, the left and right sides refer to a state in which the power unit is mounted in the motorcycle. First to fifth lower journal walls 26 to 30, corresponding to the first to fifth upper journal walls 21 to 25, are provided in the lower case 13b such that the first to fifth lower journal walls 26 to 30 are connected to the corresponding first to fifth upper journal walls 21 to 25 as shown in FIG. 2. The crankshaft 12 is rotatably supported between bonded faces of the upper and lower cases 13a, 13b, that is, between the corresponding bonded faces of the first to fifth upper journal walls 21 to 25 and the first to fifth lower journal walls 25 to 30.

An outer rotor 31 is fixed to an end of the crankshaft 12 which is disposed and arranged to protrude outwardly from the left side wall of the crankcase 13, that is, from between the first upper and lower journal walls 21, 26. In addition, an inner rotor 32, which cooperates with the outer rotor 31 to configure a generator 33, is attached to a generator cover 34 which, in turn, is fastened to the left wall of the crankcase 13. The generator cover 34 is used to cover the generator 33.

As shown in FIG. 2, a combustion chamber 35 is formed opposite to the top of each piston 19, fitted into each cylinder bore 18 so that the piston can be slid, between the cylinder block 14 and the cylinder head 15. A pair of exhaust valves 37 are arranged within every combustion chamber 35 in the cylinder head 15 so that the exhaust valves can be opened. The exhaust valves 37 are spring biased in a direction in which the exhaust valve is closed. A cylindrical lifter 39 having a closed end is disposed on the upper side of each exhaust valve. The inner face of the closed end of a lifter 39 contacts the top of a respective exhaust valve 37, and the valve lifter 39 is fitted within the cylinder head 15 so that the lifter 39 reciprocates in the opening/closing direction of the exhaust valve 37. In addition, in the cylinder head 15, like the exhaust valves, a pair of intake valves (not shown) are arranged in every combustion chamber 35 so that the intake valves can be opened, the intake valves being spring biased in a direction in which the intake valve is closed. A cylindrical lifter (not shown) having a closed end is disposed on the upper side of each intake valve. The inner face of the closed end of the lifter contacts the top of each intake valve, and the lifter is fitted within the cylinder head 15 so that the lifter reciprocates in the opening/closing operating direction of the intake valve.

An exhaust-side camshaft 45 is provided with plural cams 44 on the exhaust side which slide on the outside face of the closed end of each lifter 39 on the side of the exhaust valve. The exhaust-side camshaft 45 is supported by the cylinder head 15, and exhaust-side cam holders 41, 41 are fastened to the cylinder head 15 so that the camshaft 45 can rotate in parallel with the crankshaft 12. An intake-side camshaft 43 (see FIG. 1) is provided with plural cams 42 (see FIG. 1) on the intake side which slide on the outside face of the closed end of each lifter on the side of the intake valve. The intake-side camshaft 43 is supported by the cylinder head 15 and an intake-side cam holder (not shown) is fastened to the cylinder head 15, so that the intake-side camshaft 43 can rotate in parallel with the crankshaft 12.

The rotational power of the crankshaft 12 is transmitted to the camshafts 43, 45 on the intake side and on the exhaust side via timing transmission means 51. The timing transmission means 51 is provided with driven sprockets on the intake side and on the exhaust side 46, 47 fixed to the right ends of the camshafts 43, 45. A driving sprocket 48, provided on the crankshaft 12 outside the fifth upper and lower journal walls 25, 30 drives the respective driven sprockets 46, 47 through an endless cam chain 49. The cam chain 49 is wound onto the driving sprocket 48, the exhaust-side driven sprocket 47 and the intake-side driven sprocket 46, and a chain passage 50, within which the cam chain 49 travels, is formed in the cylinder block 14, the cylinder head 15 and the head cover 16 on the side of the other end of the crankshaft 12.

A one-way starter clutch 52 includes a clutch outer race 53 in which relative rotation with the crankshaft 12 is impossible, and a clutch inner race 54 in which relative rotation with the crankshaft 12 is enabled. The one-way starter clutch 52 is provided with a driven gear 55 to which power from a starting motor, not shown, is input. The one-way starter clutch 52 is installed on the other end (that is, the end opposed to the end upon which generator 33 is mounted) of the crankshaft 12, so as be disposed on the outside relative to the driving sprocket 48. The one-way starter clutch 52 enables only the transmission of power from the clutch inner race 54 to the clutch outer race 53, that is, from the staffing motor to the side of the crankshaft 12.

A pair of left and right mounting cylinders 56, 56, corresponding to a pair of cylinders located on the left side and a pair of cylinders located on the right side, protrude from the head cover 16, and caps 57 are fastened to the mounting cylinders 56.

A secondary air passage 58, individually open to an exhaust port of each cylinder, is independently formed in the mounting cylinders 56. A reed valve 59 is provided for each of the secondary air passages 58, and is held between the mounting cylinders 56 and the cap 57. In addition, a connecting tube 57a for connecting a pipe for directing filtered secondary air from an air cleaner (not shown) to the secondary air passages is integrated with each cap 57.

Figure 4:
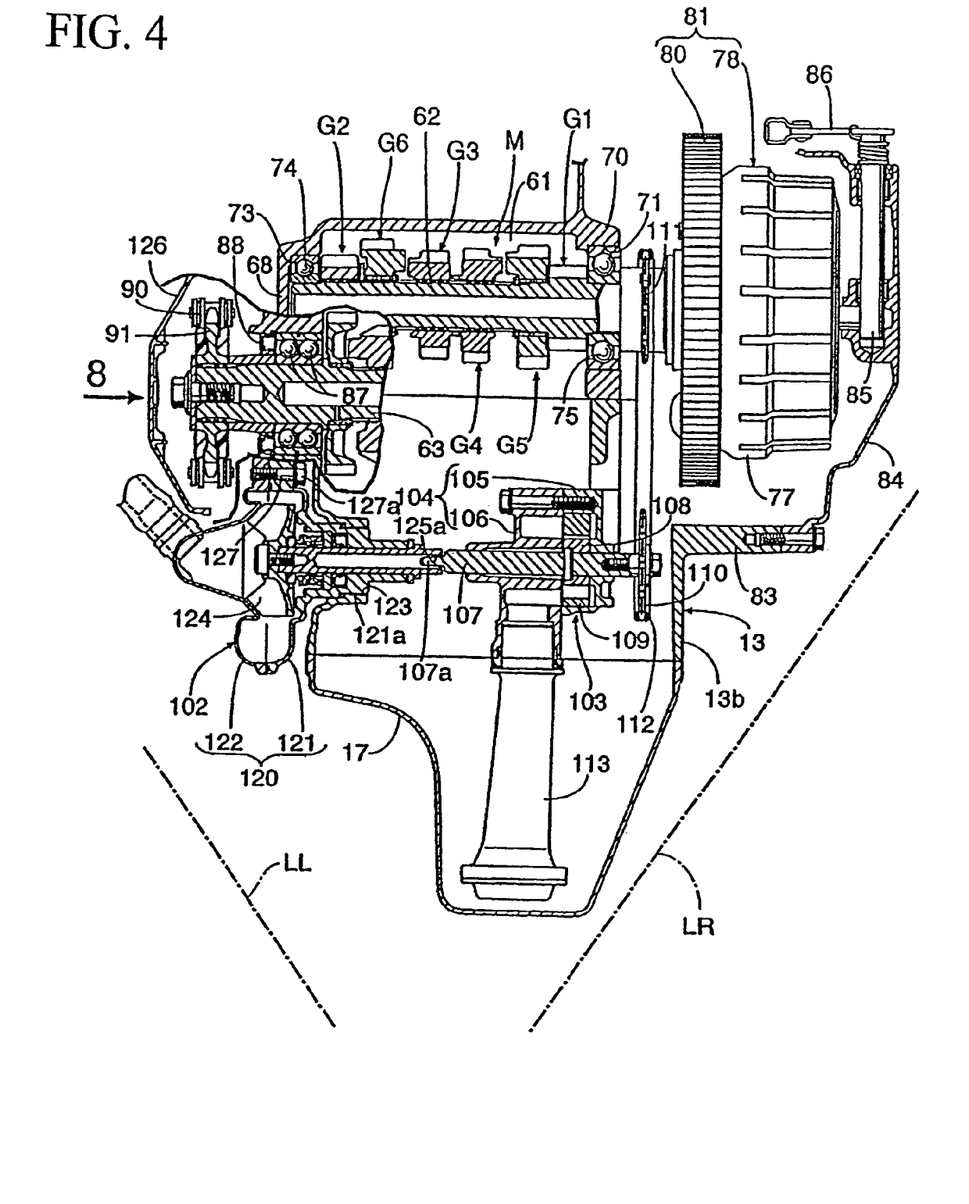
FIG. 4 is an enlarged sectional view of the power unit of FIG. 1 as seen along a line 4-4 showing an oil pan formed in a shape which advantageously avoids interference with the ground surface (represented by broken lines LL and RR) during banking of the vehicle.
Figure 5:
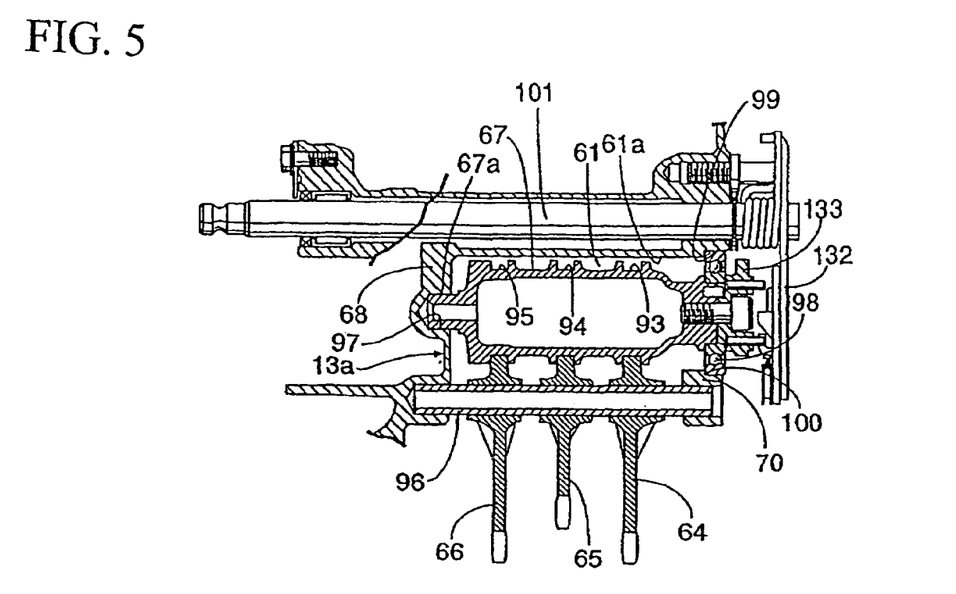
FIG. 5 is an enlarged sectional view of the shift drum assembly viewed along a line 5-5.

Also referring to FIGS. 4 and 5, a transmission chamber 61 is formed in the crankcase 13 rearward (relative to the state mounted in the motorcycle) of the crankshaft 12, and a main part of the transmission M is housed in the transmission chamber 61.

The transmission M is provided with a main shaft 62 having an axis parallel to the crankshaft 12, and a countershaft 63 having an axis parallel to the main shaft 62. The transmission M includes plural shift mechanisms provided between the main shaft 62 and the countershaft 63 so that different relative arrangements of the shift mechanisms can be selectively established, consisting of for example, six first- to sixth-speed gears G1 to G6. The transmission M also includes three shift forks 64, 65, 66 for selectively establishing relative arrangements of the first- to sixth-speed gears G1 to G6, and a shift drum 67 for driving the shift forks 64, 65, 66. Substantial portions of the main shaft 62, the countershaft 63 and the shift drum 67, respectively, are housed in the transmission chamber 61, and the first- to sixth-speed gears G1 to G6 and the shift forks 64, 65, 66 are housed in the transmission chamber 61 so that they can be operated.

In the upper and lower cases 13a, 13b of the crankcase 13, upper and lower left supporting walls 68, 69 form a left end wall of the transmission chamber 61 when mounted in the motorcycle. The upper and lower left supporting walls are connected in positions substantially corresponding to the second upper and lower journal walls 22, 26. Upper and lower right supporting walls 70, 71 form a right end wall of the transmission chamber 61 when mounted in the motorcycle. The upper and lower right supporting walls 70, 71 are connected in positions substantially corresponding to the fourth upper and lower journal walls 24, 29. The upper and lower left supporting walls 68, 69 are arranged inside a part supporting the crankshaft 12 of the left wall of the crankcase 13 along the axis of the crankshaft 12.

Figure 6:
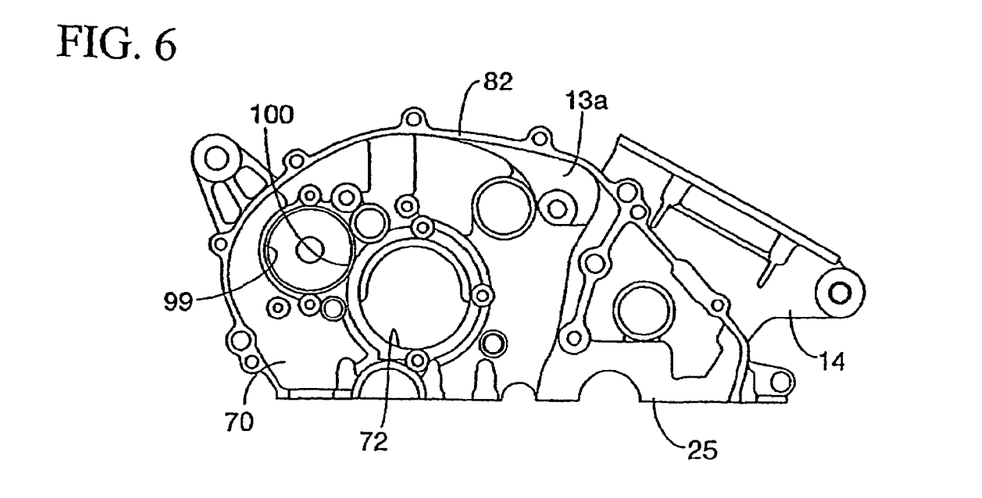
FIG. 6 is a view of the power unit of FIG. 1 as seen from a direction shown by an arrow 6 in FIG. 3.
Figure 7:
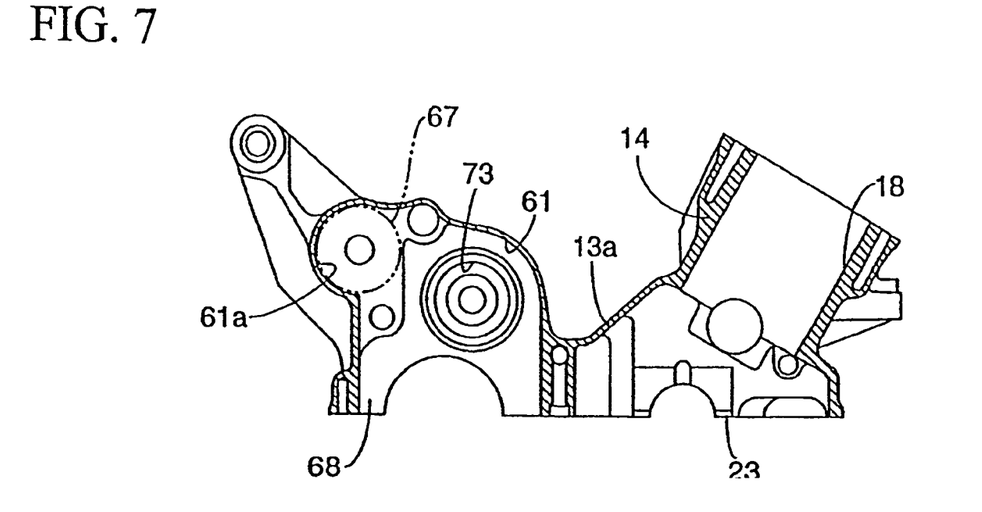
FIG. 7 is a sectional view of the power unit of FIG. 1 as seen along a line 7-7 shown in FIG. 3.

Also referring to FIGS. 6 and 7, a supporting hole 72 for piercing the main shaft 62 so that the main shaft can be rotated is provided to the right upper supporting wall 70 of the upper case 13a and a supporting concave portion 73 which is coaxial with the supporting hole 72 is provided to the left upper supporting wall 68. A ball bearing 74 is inserted between the outside periphery at one end of the main shaft 62 and the inside circumference of the supporting concave portion 73, and a ball bearing 75 is inserted between the inside circumference of the supporting hole 72 and the main shaft 62. That is, one end of the main shaft 62 is supported by the left upper supporting wall 68 so that one end of the main shaft 62 can be rotated, an intermediate part of the main shaft 62 is supported by the right upper supporting wall 70 so that the intermediate part of the main shaft can be rotated, and the other end of the main shaft 62 protrudes outside the right upper supporting wall 70, that is, outside the right side of the crankcase 13.

A clutch 78 is provided with a clutch inner member (not shown) in which relative rotation with the main shaft 62 is impossible, and a clutch outer member 77 in which relative rotation with the main shaft 62 is enabled. The clutch 78 is formed in a conventional well-known multiple disc type, and is installed at the right end of the main shaft 62. A primary driven gear 80, together with the clutch 78 forming a clutch mechanism 81, is coupled to the clutch outer member 77 via a damper spring (not shown). A primary driving gear 79 is provided on the crankshaft 12 inside the fifth upper and lower journal walls 25, 30, and is engaged with the primary driven gear 80 as shown in FIG. 2. In addition, the maximum outside diameter of the clutch mechanism 81 is determined by that of the primary driven gear 80.

Extended wall parts 82, 83, which extend outward to the right to form a cylinder for encircling the clutch 78 and the one-way starter clutch 52 in collaboration, are provided to the upper and lower cases 13a, 13b in the crankcase 13. A right cover 84 for covering the clutch 78 and the one-way clutch starter 52 is fastened to the extended wall parts 82, 83. In addition, the extended wall parts 82, 83 and the right cover 84 are bonded so that they have an inside inclined plane along the axis of the crankshaft 12 in a lower part.

An operating shaft 85 for letting in/out the clutch 78 is rotatably supported by the right cover 84, and a release lever 86 is provided on an end of the operating shaft 85 which protrudes from the right cover 84.

The countershaft 63 is rotatably supported by the bonded faces of the upper case 13a and the lower case 13b of the crankcase 13, respectively, and is arranged on the rear side of the crankshaft 12. One end of the countershaft 63 protrudes outside through the left upper supporting wall 68 and the left lower supporting wall 69. A ball bearing 87, and a circular sealing member 88 arranged outside the ball bearing 87, are inserted between the left upper supporting wall 68 and the countershaft 63 and between the left lower supporting wall 69 and the countershaft 63. The other end of the countershaft 63 is rotatably supported by the right upper supporting wall 70 and the right lower supporting wall 71 via a needle bearing 89.

The main shaft 62 is rotatably supported by the upper case 13a of the upper and lower cases 13a, 13b which respectively form the crankcase 13, while the crankshaft 12 and the countershaft 63 are rotatably supported between the upper and lower cases 13a, 13b. The main shaft 62 is arranged above a straight line extending between the axis of the crankshaft 12 and an axis of the countershaft 63, that is, above the bonded faces of the upper and lower cases 13a, 13b.

A driving sprocket 91 is provided on one end of the countershaft 63, which protrudes from the left upper supporting wall 68 and the left lower supporting wall 69, and an endless chain 90 is wound about the driving sprocket 91 and a sprocket (not shown) operatively connected to a rear wheel (not shown) in order to transmit power to the rear wheel which is a driving wheel.

As shown in FIG. 5, both ends of the shift drum 67 are rotatably supported by the left and right upper supporting walls 68, 70 of the upper case 13a in the crankcase 13, and the shift forks 64, 65, 66 are fitted into three fitting grooves 93, 94, 95 provided to the outside face of the shift drum 67. The shift forks 64, 65, 66 are supported in common by a single spindle 96 having an axis parallel to the axis of the shift drum 67, and are provided between the left and right upper supporting walls 68, 70 so that the shift forks can slide in an axial direction of the spindle.

A small-diameter shank 67a coaxially and integrally protrudes from one end of the shift drum 67, and fits into a supporting concave portion 97 provided on the left upper supporting wall 68 in a manner in which the shank can be rotated. In addition, the shift drum 67 is attached to the crankcase 13 from the side of the clutch mechanism 81 installed at the right end of the main shaft 62. A supporting hole 99 receives a ball bearing 98 therein. The ball bearing 98 is a bearing member which is installed on the periphery of one end of the shift drum 67, the one end corresponding to the same side as the clutch 78. A receiving flange 100 extends inside in a radial direction from the inner end of the supporting hole 99 to receive the inner end of an outer ring of the ball bearing 98. The supporting hole 99 and receiving flange 100 are coaxially arranged on the right upper supporting wall 70 of the upper case 13a.

The shift drum 67 is disposed at a location corresponding to the maximum outside diameter of the clutch mechanism 81 as viewed in a plane perpendicular to an axis of the main shaft 62, shown in FIG. 1. A shift drum chamber 61a, forming a part of the transmission chamber 61 and housing most of the shift drum 67, is formed in the rear of the upper case 13a in the crankcase 13 in a configuration in which the shift drum chamber protrudes semi-circularly toward the rear of the crankcase 13, when the shift drum chamber is viewed from an axial direction of the shift drum 67. A wall forming the shift drum chamber 61a is also substantially housed within the maximum outside diameter of the clutch mechanism 81, that is, within the outside diameter of the primary driven gear 80 as viewed in a plane perpendicular to the axis of the main shaft 62. In addition, the shift drum chamber 61a has the same diameter as the inside diameter of the receiving flange 100 that is formed on the right upper supporting wall 70, and is cast out when the upper case 13a is cast. An upper part of the transmission chamber 61 overlaps with the clutch mechanism 81 as viewed in a plane perpendicular to the axis of the main shaft 62, shown in FIG. 1.

A gearshift selector shaft 101 is rotatably supported by the upper case 13a. A part of the gearshift selector shaft 101 protrudes leftward from the upper case 13a, and one end of a shift arm 132 is provided on the protruding end of the gearshift selector shaft 101. A shift cam 133 is provided on the other end of the shift drum 67, and the other end of the shift arm 132 is fitted to the shift cam 133 to turn the shift drum 67 according to the turning of the gearshift selector shaft 101.

Figure 8:
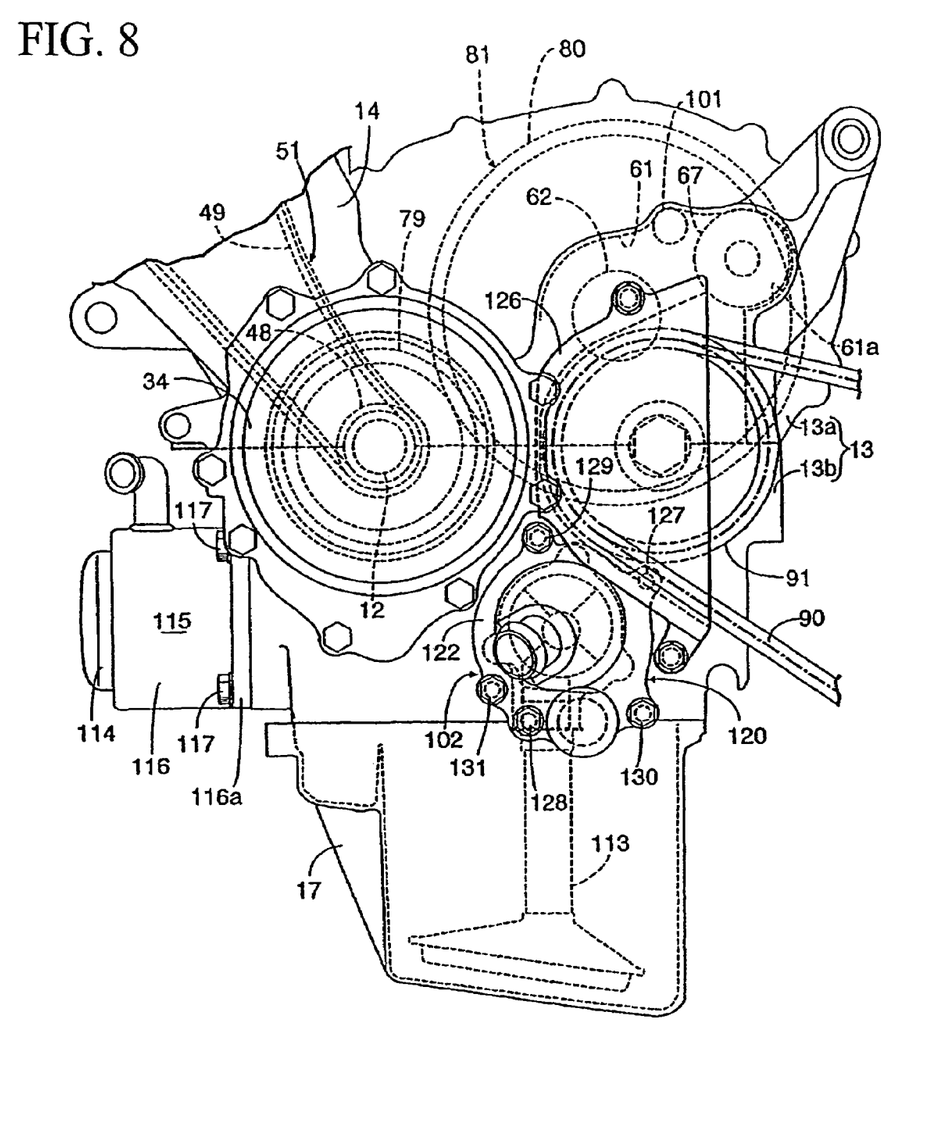
FIG. 8 is a view of the power unit of FIG. 1 as seen from a direction shown by an arrow 8 in FIG. 4.

A water pump 102 is arranged on the left side of the lower case 13b in the crankcase 13, between the crankshaft 12 and the countershaft 63 when viewed from the side as shown in FIG. 8. An oil pump 103, coaxial with the water pump 102, is also housed in a lower part of the crankcase 13.

As shown in FIG. 4, the oil pump 103 is a trochoid type pump. A pump housing 104 is formed by a housing main part 105 integrated with a lower part of the right lower supporting wall 71 in the lower case 13b, and a cover 106 fastened to the housing main part 105. An inner rotor 108 is fixed to an oil pump shaft 107 that extends through the pump housing 104 in a manner such that the oil pump shaft can be rotated. An outer rotor 109 is engaged with the inner rotor 108, and both the inner rotor 108 and outer rotor 109 are housed between the housing main part 105 and the cover 106.

A driven sprocket 110 for a pump is fixed to the protruding end of the oil pump shaft 107, which protrudes from the housing main part 105. An endless chain 112 is wound about a driving sprocket 111 for a pump and the driven sprocket 110. The driving sprocket 111 for a pump rotates integrally with the primary driven gear 80 installed on the main shaft 62 so that the primary driven gear 80 can be relatively turned to transmit power from the crankshaft 12.

The oil pan 17, connected to the lower part of the crankcase 13, is formed so that the lateral width in a lower part thereof is narrowed when the oil pan 17 is viewed from a longitudinal direction of the motorcycle. This configuration permits the oil pan 17 to avoid contact with road surfaces when the motorcycle is banked laterally. In FIG. 4, the location of the road surface during vehicle banking is indicated by chain lines LL, LR, and the oil pan 17 is shaped to avoid contact with the ground surface during banking. An oil strainer 113, housed in the oil pan 17, is connected to a lower part of the cover 106 in the pump housing 104 of the oil pump 103. The oil pump 103 draws in oil reserved in the oil pan 17 via the oil strainer 113.

Figure 9:
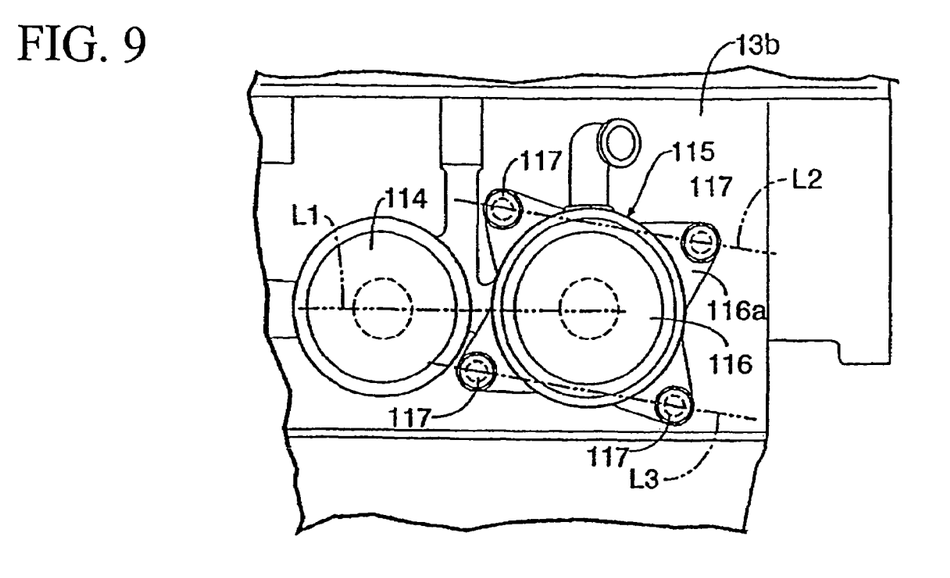
FIG. 9 is a view of the power unit of FIG. 1 as seen from a direction shown by an arrow 9 in FIG. 1.

As shown in FIG. 9, an oil filter 114 and an oil cooler 115 are attached to a front side wall in the lower case 13b of the crankcase 13 in a side-by-side configuration so that a first straight line L1 extending between their respective centers is parallel with the bonded faces of the upper and lower cases 13a, 13b.

A flange 116a is fastened to the lower case 13b by four bolts 117. The flange 116 is used to secure a cooler case 116 of the oil cooler 115 to the crankcase 13. The four bolts 117 are arranged at equal intervals in a circumferential direction of the oil cooler 115. A pair of the bolts 117, 117 of the four bolts 117 are arranged on a second straight line L2. Second straight line L2, positioned above the first straight line L1, is inclined so that the second straight line L2 near the oil cooler 115 is closer to the first straight line L1 than the second straight line L2 near the oil filter 114. The remaining pair of the bolts 117, 117 of the four bolts 117 are arranged on a third straight line L3, which extends in parallel with the second straight line L2 and is positioned below the first straight line L1.

Oil drawn in via the oil strainer 113 is supplied from the oil pump 103 to the oil filter 114. The oil purified through the oil filter 114 is directed to the oil cooler 115 and is cooled, and then the oil is supplied to each lubricated part of the engine body 11 of the engine.

As shown in FIG. 4, a pump case 120 of the water pump 102 is formed by fastening together a pair of case halves 121, 122. The water pump 102 is arranged on an inner side relative to the driving sprocket 91 in a direction along the axis of the countershaft 63.

A supporting cylinder 121a is formed integrally with one case half 121 of the pump case 120. The supporting cylinder 121 is fitted into a mounting hole 123 provided on a left wall of the lower case 13b in a fluid-tight manner. A moving blade 124 is housed in the pump case 120 and is fixed to one end of a water pump shaft 125. The water pump shaft 125 is arranged coaxially with the oil pump shaft 107 of the oil pump 103. The water pump shaft 125 extends through the supporting cylinder 121a in a fluid-tight manner and so that the water pump shaft can be rotated. The other end of the water pump shaft 125 protrudes from the pump case 120.

In addition, a projection 107a, protruding from one end of the oil pump shaft 107, is fitted within a fitting concave portion 125a provided at one end of the water pump shaft 125 so that the projection can be detached. That is, the oil pump 103 is driven by power transmitted from the crankshaft 12 and the water pump 102 is also driven by the power transmitted from the crankshaft 12.

A cover 126 is arranged so that at least a part of the cover 126 overlaps the water pump 102 from the outside when viewed from a direction along the axis of the countershaft 63. The cover 126 is attached to the lower case 13b of the crankcase 13 with the cover covering the driving sprocket 91.

A pair of the case halves 121, 122 forming the pump case 120 are fastened together at intervals in the circumferential direction by five bolts 127, 128, 129, 130, 131 (FIG. 8). However, an extended-diameter head 127a of the bolt 127 is arranged in an overlapping position with respect to the chain 90 that is wound onto the driving sprocket 91 as viewed in a plane perpendicular to the axis of the countershaft 63. The extended-diameter head 127a of the bolt 127 is arranged on the side of the crankcase 13 by being tightened through the bolt 127 from the side of the case half 121.

Both case halves 121, 122 are fastened by inserting the bolt 127 from the side of the case half 121, however, the bolts 129, 130, 131 of the remaining bolts 128 to 131 also play a role in attaching the pump case 120 to the crankcase 13.

Further, a rear portion of the generator cover 34 overlaps from the outside a front portion of the cover 126 when the rear portion of the generator cover is viewed from the outside in an axial direction of the countershaft 63. One of the bolts 128 is arranged below the overlapping portions of the generator cover 34 and the cover 126, whereby the part fastened by the bolt 128 can be efficiently arranged in space between the generator cover 34 and the cover 126, and the water pump 102 can be arranged close to the side of the crankshaft 12.

Next, to explain the action of this embodiment, the shift drum 67 is arranged in the maximum outside diameter of the clutch mechanism 81 installed at the end of the main shaft 62 when viewed in the plane perpendicular to the axis of the main shaft 62. In addition the shift drum is assembled in the crankcase 13 from the side of the clutch mechanism 81.

Therefore, since a part to be sealed between the shift drum 67 and the crankcase 13 is included in a sealed range of the clutch mechanism 81, the sealed range is not required to be enlarged and a dedicated sealing structure for the shift drum 67 is not required, the number of parts and the number of assemblies can be reduced. In addition, walls forming the shift drum chamber 61a are also substantially included in the maximum outside diameter of the clutch mechanism 81 as viewed in the plane perpendicular to the axis of the main shaft 62 whereby a sealed range is not required to be enlarged.

The transmission chamber 61 houses most of the main shaft 62, the countershaft 63 and the shift drum 67 in the transmission M, and also houses the first to sixth gears G1 to G6 and the shift forks 64 to 66 so that they can be operated. The transmission chamber 61 is formed in the crankcase 13 rearward of the crankshaft 12 when mounted in the motorcycle, and the shift drum chamber 61a, forming a part of the transmission chamber 61 and housing most of the shift drum 67, is formed in the rear of the crankcase 13 such that the shift drum chamber 61a protrudes semi-circularly toward the rear of the crankcase 13 when the shift drum chamber is viewed from the axial direction of the shift drum 67. As a result, a part, except the shift drum chamber 61a in the transmission chamber 61, can be made compact.

The crankcase 13 is formed by connecting together the respective cast upper and lower cases 13a, 13b. The crankshaft 12 and the countershaft 63 are supported between the bonded faces of the upper and lower cases 13a, 13b so that they can be rotated. An upper part of the transmission chamber 61 formed by the upper case 13a overlaps the clutch mechanism 81 when viewed in the plane perpendicular to the axis of the main shaft 62. As a result, the rear end of the crankcase 13 can be arranged close to the axis of the countershaft 63 when mounted in the motorcycle. In addition, in the motorcycle provided with the swing arm for supporting the rear wheel, a part supporting the front end of a swing arm (not shown) can be arranged close to the countershaft 63.

Further, the upper case 13a supporting both ends of the shift drum 67 forms a part of the crankcase 13 and is cast, however, as the receiving flange 100 for receiving the ball bearing 98 installed on the periphery of one end on the side of the clutch 78 of the shift drum 67 from the side of the clutch mechanism 81 is formed in the upper case 13a, the shift drum chamber 61a has the same diameter as the inside diameter of the receiving flange 100 and is cast out, the upper case 13a is not required to be machined to form the shift drum chamber 61a and the cost can be reduced. Besides, as the shift drum 67 can be assembled in the crankcase 13 from the side of the clutch mechanism 81 in a state in which the ball bearing 98 and the shift cam 133 are attached to the shift drum 67 beforehand, the efficiency of assembly and operability are enhanced.

In addition, one end of the countershaft 63 in the transmission M protrudes from the left side of the crankcase 13. The driving sprocket 91 is provided on the protruded end of the countershaft 63, and the chain 90 for transmitting power to the driving wheel is wound onto the driving sprocket 91. The water pump 102 is arranged between the crankshaft 12 and the countershaft 63 when viewed from a lateral side, and is further arranged on the left face of the crankcase 13 on an inner side relative to driving sprocket 91 when viewed from the rear.

Therefore, the water pump 102 does not protrude outside the driving sprocket 91, the power unit can be made compact in a direction along the axis of the crankshaft 12, and the driving performance of the motorcycle is enhanced owing to the concentration of mass.

In addition, the cover 126 is arranged so that at least a part thereof overlaps the water pump 102 from the outside when the cover 126 is viewed from the direction along the axis of the countershaft 63, and the cover 126 is attached to the crankcase 13, covering the driving sprocket 91. As a result, the countershaft 63 and the water pump 102 can be arranged in close proximity, and since accessories such as the water pump 102 and the driving sprocket 91 can be also massed three-dimensionally, mass can be even more concentrated.

Since the main shaft 62 of the transmission M is arranged above a straight line which extends between the axis of the crankshaft 12 and the axis of the countershaft 63, the distance between the main shaft 62 and the crankshaft 12 can be reduced and the power unit can be made compact in a direction along the straight line which extends between the axis of the crankshaft 12 and the axis of the countershaft 63.

In addition, since the water pump 102 is arranged on an inner side relative to the driving sprocket 91, the position of the water pump 102 relative to the bottom of the crankcase 13 is raised and the lower part of the crankcase 13 can be made compact. In the case in which the water pump 102 is driven by the transmission of power from the main shaft 62 of the transmission M as in this embodiment, and the case in which the water pump 102 is driven by the transmission of power from the countershaft 63 or the crankshaft 12, then the main shaft 62, the countershaft 63 or the crankshaft 12 and a shaft of the water pump 102 can be closely arranged, the distance of coupling by a driving member such as the chain 112 and a gear is reduced and the overall transmission weight can be reduced.

Further, plural bolts 127 to 130 are use to fasten a pair of the case halves 121, 122, forming the pump case 120 of the water pump 102 to the crankcase 13. The extended-diameter head 127a of the bolt 127 is arranged in a position that overlaps the chain 90, wound onto the driving sprocket 91, when viewed in a plane perpendicular to the axis of the countershaft 63. As a result, the chain 90 and the pump case 120 can be arranged in closer proximity, preventing the extended-diameter head 127a of the bolt 127 from interfering with the chain 90, and the power unit can be made more compact in the direction along the axis of the countershaft 63.

While a working example of the present invention has been described above, the present invention is not limited to the working example described above, but various design alterations may be carried out without departing from the present invention as set forth in the claims.

What is claimed is:

1. A power unit for a vehicle, the power unit comprising:
    a crankcase,
    a crankshaft rotatably supported within the crankcase, and
    a transmission structure, comprising:
    a main shaft,
    a countershaft,
    plural gear sets for selectively connecting the countershaft and the main shaft, wherein said transmission structure is configured to permit selection of one of the plural gear sets,
    a clutch mechanism for selectively connecting the crankshaft and the main shaft, and a shift drum that drives shift forks in order to select one of the plural gear sets, said shift drum having opposed axial ends,
    wherein the crankshaft, the main shaft and the countershaft are rotatably supported by the crankcase and have mutually parallel axes,
    wherein the clutch mechanism is installed at an end of the main shaft at a location outside the crankcase,
    wherein both axial ends of the shift drum are supported by the crankcase so that the shift drum can rotate about an axis parallel to the axes of the crankshaft, the main shaft and the countershaft,
    wherein the shift drum is disposed at a location corresponding to the maximum outside diameter of the clutch mechanism when viewed in a plane perpendicular to the axis of the main shaft,
    and wherein the shift drum is installed in the crankcase from a side of the crankcase to which the clutch mechanism is attached, and the shift drum is situated such that a junction between the shift drum and the crankcase is included in a sealed range of the clutch mechanism.

2. The power unit for a vehicle according to claim 1, wherein
    the crankcase comprises an upper case formed by casting and a lower case formed by casting,
    a supporting hole is provided in a first side of the upper case, and a supporting concave portion which is coaxial with the supporting hole is provided in a side of the upper case opposed to the first side,
    one end of the main shaft is rotatably supported by the supporting concave portion, an intermediate part of the main shaft is rotatably supported by the supporting hole, and an other end of the main shaft protrudes outside of the crankcase through a wall of the upper case.

3. The power unit for a vehicle according to claim 1, wherein
    the clutch mechanism further comprises a clutch inner member, a clutch outer member, and a primary driven gear, and the primary driven gear is coupled to the clutch outer member, and has a peripheral edge corresponding to an outer diameter of the primary driven gear,
    wherein when viewed from a lateral side of the power unit when the power unit is mounted in the vehicle, an outer periphery of the shift drum coincides with the peripheral edge of the primary driven gear.

4. The power unit for a vehicle according to claim 1, wherein the shift drum is
    substantially housed within a shift drum chamber,
    wherein when viewed from an axial direction of the shift drum, the shift drum chamber is disposed in a rear portion of the crankcase so that the shift drum chamber protrudes semi-circularly toward the rear of the crankcase, and wherein an axial line of the shift drum is disposed above and toward the rear of the crankcase with respect to the main shaft.

5. The power unit for a vehicle according to claim 1, wherein the transmission structure is disposed in the crankcase rearward of the crankshaft when the power unit is mounted in the vehicle, and wherein the transmission structure further comprises a transmission chamber housing each gear set and the shift forks, and
    a shift drum chamber forming a part of the transmission chamber and housing most of the shift drum, the shift drum chamber disposed in a rear portion of the crankcase so that the shift drum chamber protrudes semi-circularly toward the rear of the crankcase when the shift drum chamber is viewed in an axial direction of the shift drum.

6. The power unit for a vehicle according to claim 5, wherein:
    the crankcase comprises an upper case formed by casting and a lower case formed by casting, wherein
    the crankcase is formed by connecting the upper case to the lower case along respective bonded faces of the upper and lower cases;
    the crankshaft and the countershaft are rotatably supported between the bonded faces of the upper and lower cases; and
    an upper part of the transmission chamber is formed by the upper case, and the upper part of the transmission chamber overlaps the clutch mechanism when viewed in said plane perpendicular to the axis of the main shaft.

7. The power unit for a vehicle according to claim 5, wherein:
    the crankcase further comprises a receiving flange and a bearing member,
    the receiving flange is formed the upper case, the upper case supporting both ends of the shift drum, the receiving flange receiving the bearing member thereon,
the bearing member being installed on the periphery of one end of the shift drum on the side of the clutch mechanism, the bearing member being installed from the side of the clutch mechanism; and
wherein the shift drum chamber has a diameter which is substantially the same as the inside diameter of the receiving flange.

8. The power unit for a vehicle according to claim 1, wherein
the countershaft has opposed first and second ends, and both the first and second ends are rotatably supported between the upper case and the lower case of the crankcase, respectively, and are arranged on the rear side of the crankshaft when the power unit is mounted in the vehicle,
the countershaft protrudes through an opening formed in a first side of the crankcase so that the first end of the countershaft is disposed outside the crankcase, and a circular sealing member is inserted between both the upper case and the countershaft, and between the lower case and the countershaft,
the second end of the countershaft is rotatably supported on a second side of the crankcase via a bearing member.

9. The power unit for a vehicle according to claim 8, wherein a drive sprocket is disposed on the first end of the countershaft, and wherein a water pump is disposed between the drive sprocket and the first side of the crankcase when the power unit is viewed from the rear while mounted in the vehicle.

10. A power unit for a vehicle, the power unit comprising
a crankcase comprising an upper case formed by casting and a lower case formed by casting,
a crankshaft rotatably supported within the crankcase, and
a transmission structure, the transmission structure comprising
a main shaft,
a countershaft,
plural gear sets for selectively connecting the countershaft and the main shaft, wherein said transmission structure is configured to permit selection of one of the plural gear sets,
a clutch mechanism for selectively connecting the crankshaft and the main shaft, and a shift drum that drives shift forks, in response to user input, to select one of the plural gear sets, said shift drum having opposed axial ends;
wherein the crankshaft, the main shaft, and the countershaft have mutually parallel axes,
wherein the crankcase comprises a transmission chamber housing each gear set and the shift forks, and a shift drum chamber forming a part of the transmission chamber and housing most of the shift drum,
wherein the transmission structure is disposed in the crankcase rearward of the crankshaft when the power unit is mounted in the vehicle;
wherein the shift drum chamber is disposed in a rear portion of the crankcase and comprises a semicircular protrusion extending outward from a wall thereof toward the rear of the crankcase when the shift drum chamber is viewed from an axial direction of the shift drum;
wherein both axial ends of the shift drum are supported by the crankcase so that the shift drum can rotate about an axis parallel to the axis of the crankshaft,
wherein the shift drum is disposed at a location corresponding to the maximum outside diameter of the clutch mechanism when viewed in a plane perpendicular to the axis of the main shaft,
and wherein the shift drum is installed in the crankcase from a side of the crankcase to which the clutch mechanism is attached, and the shift drum is situated such that a junction between the shift drum and the crankcase is included in a sealed range of the clutch mechanism.

11. The power unit for a vehicle according to claim 10, wherein:
the crankcase is formed by connecting the upper case to the lower case along respective bonded faces of the upper and lower cases;
the crankshaft and the countershaft are rotatably supported between the bonded faces of the upper and lower cases; and
an upper part of the transmission chamber is formed by the upper case, and the upper part of the transmission chamber overlaps the clutch mechanism when viewed in said plane perpendicular to the axis of the main shaft.

12. The power unit for a vehicle according to claim 10, wherein:
the crankcase further comprises a receiving flange and a bearing member,
the receiving flange is formed the upper case, the upper case supporting both ends of the shift drum,
the receiving flange receiving the bearing member thereon,
the bearing member being installed on the periphery of one end of the shift drum on the side of the clutch mechanism, the bearing member being installed from the side of the clutch mechanism; and
the shift drum chamber is cast such that with the shift drum chamber has the same diameter as the inside diameter of the receiving flange.

13. The power unit for a vehicle according to claim 10, wherein:
a supporting hole is provided in a first side of the upper case, and a supporting concave portion which is coaxial with the supporting hole is provided in a side of the upper case opposed to the first side,
one end of the main shaft is rotatably supported by the supporting concave portion, an intermediate part of the main shaft is rotatably supported by the supporting hole, and an other end of the main shaft protrudes outside of the crankcase through a wall of the upper case.

14. The power unit for a vehicle according to claim 10, wherein
the clutch mechanism further comprises a clutch inner member, a clutch outer member, and a primary driven gear, and
the primary driven gear is coupled to the clutch outer member, and has a peripheral edge corresponding to an outer diameter of the primary driven gear,
wherein when viewed from a lateral side of the power unit when the power unit is mounted in the vehicle, an outer periphery of the shift drum coincides with the peripheral edge of the primary driven gear.

15. The power unit for a vehicle according to claim 10, wherein the shift drum is substantially housed within a shift drum chamber,
wherein when viewed from an axial direction of the shift drum, the shift drum chamber is disposed in a rear portion of the crankcase so that the shift drum chamber protrudes semi-circularly toward the rear of the crankcase, and wherein an axial line of the shift drum is disposed above and toward the rear of the crankcase with respect to the main shaft.

16. The power unit for a vehicle according to claim 10, wherein
the countershaft has opposed first and second ends, and both the first and second ends are rotatably supported between the upper case and the lower case of the crankcase, respectively, and are arranged on the rear side of the crankshaft when the power unit is mounted in the vehicle,
the countershaft protrudes through an opening formed in a first side of the crankcase so that the first end of the countershaft is disposed outside the crankcase, and a circular sealing member is inserted between both the upper case and the countershaft, and between the lower case and the countershaft,
the second end of the countershaft is rotatably supported on a second side of the crankcase via a bearing member.

17. The power unit for a vehicle according to claim 16, wherein a drive sprocket is disposed on the first end of the countershaft, and wherein a water pump is disposed between the drive sprocket and the first side of the crankcase when the power unit is viewed from the rear while mounted in the vehicle.

* * * * *